(12) United States Patent
Tanaka et al.

(10) Patent No.: US 12,044,331 B2
(45) Date of Patent: Jul. 23, 2024

(54) SPOOL VALVE

(71) Applicant: KAWASAKI JUKOGYO KABUSHIKI KAISHA, Kobe (JP)

(72) Inventors: Hideki Tanaka, Kobe (JP); Seiji Aoki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 18 days.

(21) Appl. No.: 17/911,099

(22) PCT Filed: Dec. 28, 2020

(86) PCT No.: PCT/JP2020/049171
§ 371 (c)(1),
(2) Date: Sep. 12, 2022

(87) PCT Pub. No.: WO2021/181840
PCT Pub. Date: Sep. 16, 2021

(65) Prior Publication Data
US 2023/0140241 A1 May 4, 2023

(30) Foreign Application Priority Data
Mar. 12, 2020 (JP) ................................. 2020-042552

(51) Int. Cl.
| *F16K 11/07* | (2006.01) |
| *F16K 31/04* | (2006.01) |
| *F16K 31/124* | (2006.01) |
| *F16K 31/50* | (2006.01) |

(52) U.S. Cl.
CPC ............ *F16K 31/124* (2013.01); *F16K 11/07* (2013.01); *F16K 31/047* (2013.01); *F16K 31/508* (2013.01)

(58) Field of Classification Search
CPC ...... F16K 31/124; F16K 11/07; F16K 31/047; F16K 11/0708; F16K 11/0716; F16K 11/10; F16K 31/508; F15B 13/0402
See application file for complete search history.

(56) References Cited

U.S. PATENT DOCUMENTS

2020/0347953 A1  11/2020  Narita et al.

FOREIGN PATENT DOCUMENTS

| EP | 0117207 A1 | 8/1984 |
| JP | H07-099161 B2 | 10/1995 |
| JP | H11-141696 A | 5/1999 |
| JP | 2011-256993 A | 12/2011 |
| WO | 2019/138945 A1 | 7/2019 |

*Primary Examiner* — Kelsey E Cary
(74) *Attorney, Agent, or Firm* — Oliff PLC

(57) ABSTRACT

A spool is slidably located in a slide hole of a first housing. A second housing forms a servo chamber that is coaxial with the slide hole. A sleeve is slidably located in the servo chamber. A nut is fixed to a piston that is slidably fitted in the sleeve. An electric motor rotates a screw shaft screwed with the nut. The second housing includes an input port and a drain port. A first pressure chamber communicates with the input port. In a balanced state where forces applied to the sleeve from both sides are balanced, a second pressure chamber is blocked from the input port and the drain port by the piston. From the balanced state, when the piston shifts, the second pressure chamber comes into communication with the input port or the drain port.

1 Claim, 3 Drawing Sheets

SPOOL VALVE

CROSS-REFERENCE TO RELATED APPLICATIONS

This is a U.S. National Phase of International Application No. PCT/JP2020/049171 filed Dec. 28, 2020, which claims the benefit of Japanese Application No. 2020-042552 filed Mar. 12, 2020. The disclosure of the prior applications is hereby incorporated by reference herein in its entirety.

TECHNICAL FIELD

The present disclosure relates to a spool valve for shifting a spool by an electric motor.

BACKGROUND ART

Spool valves have been known as one type of flow control valves for use in hydraulic circuits. In such a spool valve, a spool is slidably located in a slide hole of a housing, and the flow rate of a fluid flowing between passages formed in the housing is controlled by the position of the spool.

In one type of spool valve, the spool is shifted by pilot pressure, and in another type of spool valve, the spool is shifted by an electric motor. For example, Patent Literature 1 discloses a spool valve that includes a linear motion mechanism between an electric motor and a spool. The linear motion mechanism converts rotational motion into linear motion. Specifically, in the spool valve, the spool is coupled to a piston; a nut is fixed to the piston; and a screw shaft screwed with the nut is rotated by the electric motor.

CITATION LIST

Patent Literature

PTL 1: WO 2019/138945 A1

SUMMARY OF INVENTION

Technical Problem

In the spool valve disclosed by Patent Literature 1, in a case where the diameter of the spool is large, a force that the spool receives from the fluid flowing between the passages is great (this force is often called "flow force"). Therefore, in this case, a high-power electric motor is necessary for precise control of the position of the spool. This causes an increase in cost as well as an increase in the size of the spool valve.

In view of the above, an object of the present disclosure is to provide a spool valve that makes it possible to precisely control the position of the spool even in a case where the electric motor is a low-power motor.

Solution to Problem

In order to solve the above-described problems, a spool valve according to the present disclosure includes: a first housing including passages and a slide hole; a spool slidably located in the slide hole; a second housing that forms a servo chamber that is coaxial with the slide hole; a sleeve slidably located in the servo chamber, the sleeve dividing the servo chamber into a first pressure chamber and a second pressure chamber, the first pressure chamber being adjacent to the first housing, the second pressure chamber being away from the first housing, the sleeve being coupled to the spool in the first pressure chamber; a piston slidably fitted in the sleeve and extending from inside the sleeve beyond the second pressure chamber; a nut fixed to the piston; a screw shaft screwed with the nut; and an electric motor that rotates the screw shaft. The second housing includes a drain port and an input port that is to be connected to a pressure source of a hydraulic fluid. The first pressure chamber communicates with the input port. In a balanced state where a force that is applied to the sleeve by the hydraulic fluid in the first pressure chamber, and a force that is applied to the sleeve by the hydraulic fluid in the second pressure chamber, are balanced, the second pressure chamber is blocked from the input port and the drain port by the piston. From the balanced state, when the piston shifts in a direction toward the spool, the second pressure chamber comes into communication with the input port. From the balanced state, when the piston shifts in a direction away from the spool, the second pressure chamber comes into communication with the drain port.

According to the above configuration, from the balanced state, when the piston is shifted by the electric motor in the direction toward the spool, the second pressure chamber comes into communication with the input port. Consequently, the pressure in the second pressure chamber increases, and the sleeve also shifts in the direction toward the spool. However, when the sleeve shifts beyond the position where the balanced state is achieved, the second pressure chamber comes into communication with the drain port, and consequently, the pressure in the second pressure chamber decreases. Due to this function, the sleeve comes to a stop again at the position where the balanced state is achieved. That is, the sleeve shifts in a manner to follow the shifting of the piston. The same applies to a case where, from the balanced state, the piston is shifted by the electric motor in the direction away from the spool.

Meanwhile, in a case where the piston does not shift, the balanced state is maintained. That is, the second pressure chamber is blocked from the input port and the drain port by the piston. Therefore, even when the spool receives a force from the fluid flowing between the passages of the first housing, due to the incompressibility of the hydraulic fluid in the second pressure chamber, the sleeve does not shift.

As described above, in the present disclosure, since the force that the spool receives from the fluid flowing between the passages does not affect the electric motor, even in a case where the electric motor is a low-power motor, the position of the spool can be controlled precisely.

Advantageous Effects of Invention

The present disclosure makes it possible to precisely control the position of the spool even in a case where the electric motor is a low-power motor.

DESCRIPTION OF EMBODIMENTS

Figure 1:
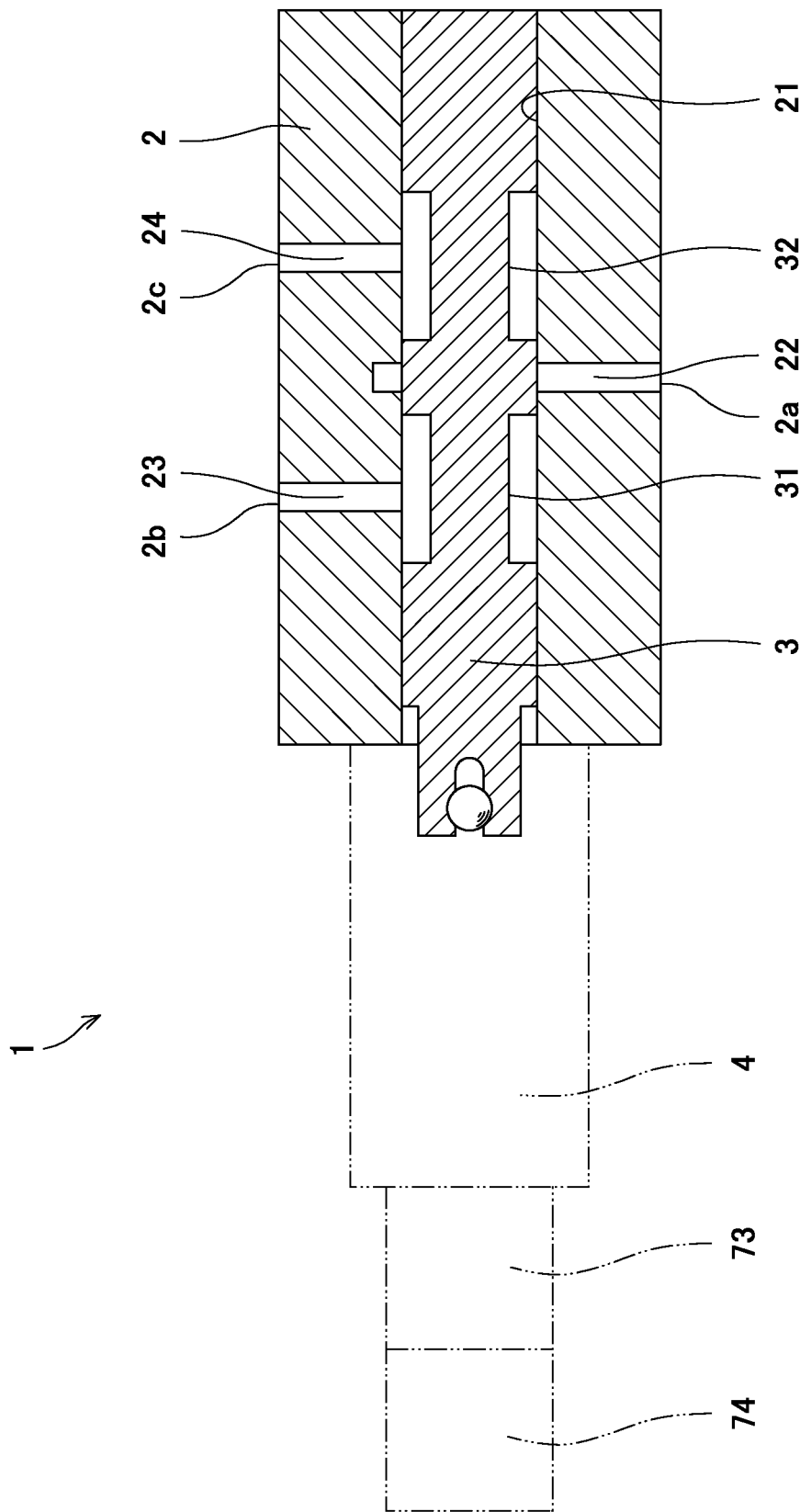
FIG. 1 is a sectional view showing an entire spool valve according to one embodiment of the present disclosure.

FIG. 1 shows a spool valve 1 according to one embodiment of the present disclosure. In the present embodiment, the spool valve 1 is a three-position valve including three ports 2a to 2c. Alternatively, the spool valve 1 may be a two-position valve. The number of ports of the spool valve 1 may be changed as necessary.

Specifically, the spool valve 1 includes a first housing 2 and a spool 3. The first housing 2 includes the ports 2a to 2c on its outer surface. The spool 3 is held by the first housing 2. The spool valve 1 further includes a second housing 4, a casing 73, and an electric motor 74, which are coaxial with the spool 3. The second housing 4 is mounted to the first housing 2, and the electric motor 74 is mounted to the second housing 4 via the casing 73.

The first housing 2 includes a slide hole 21 therein. The spool 3 is slidably located in the slide hole 21. The first housing 2 further includes three passages 22 to 24, which extend from the slide hole 21 to the ports 2a to 2c, respectively. The number of passages in the first housing 2 may be changed as necessary in accordance with the number of ports.

The spool 3 includes two annular grooves 31 and 32. Hereinafter, for the sake of convenience of the description, one side in the axial direction of the spool 3 (the right side in FIG. 1) is referred to as the right side, and the other side in the axial direction of the spool 3 (the left side in FIG. 1) is referred to as the left side. When the spool 3 is at a neutral position thereof, the spool 3 blocks the passage 22 from both of the passages 23 and 24. When the spool 3 shifts from the neutral position toward the right side, the passage 22 comes into communication with the passage 23 via the annular groove 31. When the spool 3 shifts from the neutral position toward the left side, the passage 22 comes into communication with the passage 24 via the annular groove 32.

In the present embodiment, when the spool 3 is at the neutral position, the left end of the spool 3 protrudes from the first housing 2. However, the length of the spool 3 may be changed as necessary. When the spool 3 is at the neutral position, the left end of the spool 3 may be accommodated within the first housing 2. In the present embodiment, the diameter of the left end of the spool 3 is less than the diameter of the slide hole 21. Alternatively, the diameter of the left end of the spool 3 may be the same as the diameter of the slide hole 21. Further alternatively, the diameter of the left end of the spool 3 may be larger than the diameter of the slide hole 21, so long as within the movable range of the spool 3, the left end of the spool 3 does not interfere with the first housing 2.

Figure 2:
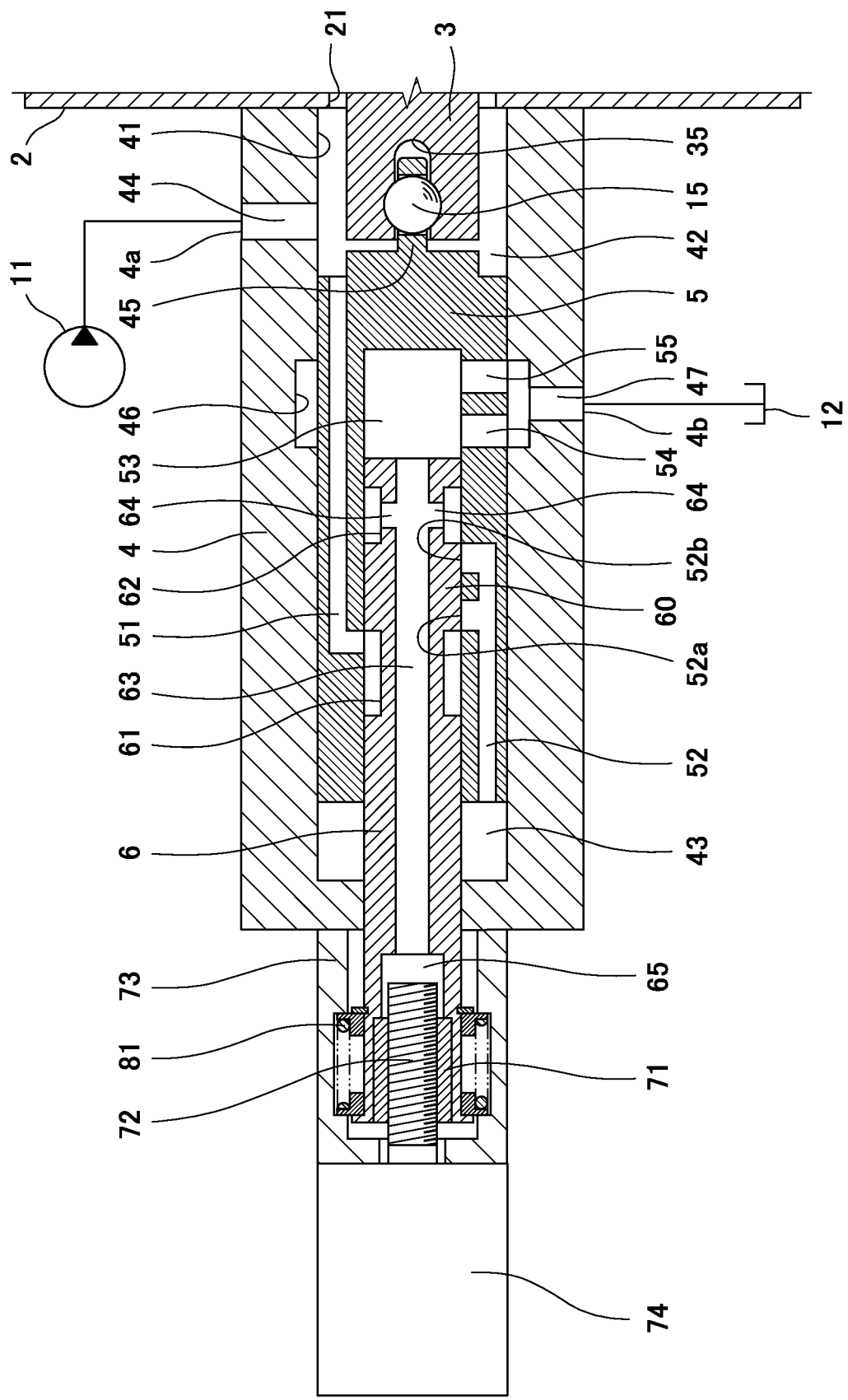
FIG. 2 is a sectional view of a part of the spool valve of FIG. 1.

As shown in FIG. 2, the second housing 4 forms a servo chamber 41, which is coaxial with the slide hole 21 of the first housing 2. Specifically, the second housing 4 includes a deep bottomed hole whose center line coincides with the center line of the slide hole 21. The bottomed hole, by being covered by the first housing 2 and the spool 3, forms the servo chamber 41.

A sleeve 5 is slidably located in the servo chamber 41. Specifically, the sleeve 5 divides the servo chamber 41 into a first pressure chamber 42 and a second pressure chamber 43. The first pressure chamber 42 is adjacent to the first housing 2. The second pressure chamber 43 is away from the first housing 2. The sleeve 5 includes a tubular portion and a sealing portion. The tubular portion surrounds an internal space of the sleeve 5. The sealing portion seals the internal space of the sleeve 5 from the right side. That is, the internal space of the sleeve 5 is open only toward the left side.

In the first pressure chamber 42, the sleeve 5 is coupled to the spool 3. In the present embodiment, the right end of the sleeve 5 and the left end of the spool 3 are coupled to each other by a universal joint. Specifically, the spool 3 includes a groove 35 at its left end. A ball 15 is held in the groove 35. The sleeve 5 includes a plate-shaped protrusion 45 at its right end. The plate-shaped protrusion 45 is located in the groove 35. The protrusion 45 includes a hole that is fitted to the ball 15.

Conversely to the present embodiment, the sleeve 5 may include, at its right end, the groove 35 in which the ball 15 is held, and the spool 3 may include, at its left end, the protrusion 45 located in the groove 35. Alternatively, the right end of the sleeve 5 and the left end of the spool 3 may be coupled to each other by a joint different from a universal joint (e.g., a ball joint or spherical joint).

A piston 6 extends from inside the sleeve 5 toward the left side beyond the second pressure chamber 43. The piston 6 is slidably fitted in the sleeve 5. The piston 6 penetrates a part of the second housing 4, the part being positioned on the left side of the second pressure chamber 43. A left side portion of the piston 6, the left side portion being positioned outside the second housing 4, is accommodated in the casing 73.

A nut 71 is fixed to the left side portion of the piston 6. To be more specific, the piston 6 includes a holding hole 65 in its left side portion. The holding hole 65 is positioned on the center line of the piston 6, and is open toward the left side. The nut 71 is located in the holding hole 65. An unshown guide mechanism guides the piston 6 such that the piston 6 is shiftable only in the left-right direction (i.e., the piston 6 is prevented from rotating).

A screw shaft 72 is screwed with the nut 71. The screw shaft 72 is rotated by the aforementioned electric motor 74. Specifically, when the electric motor 74 rotates the screw shaft 72 in one direction, the piston 6 to which the nut 71 is fixed shifts toward the right side, whereas when the electric motor 74 rotates the screw shaft 72 in the opposite direction, the piston 6 to which the nut 71 is fixed shifts toward the left side. Since the sleeve 5 shifts in a manner to follow the shifting of the piston 6, the spool 3 coupled to the sleeve 5 also shifts in the same direction and by the same amount as the piston 6. This will be described below in detail.

Figure 3:
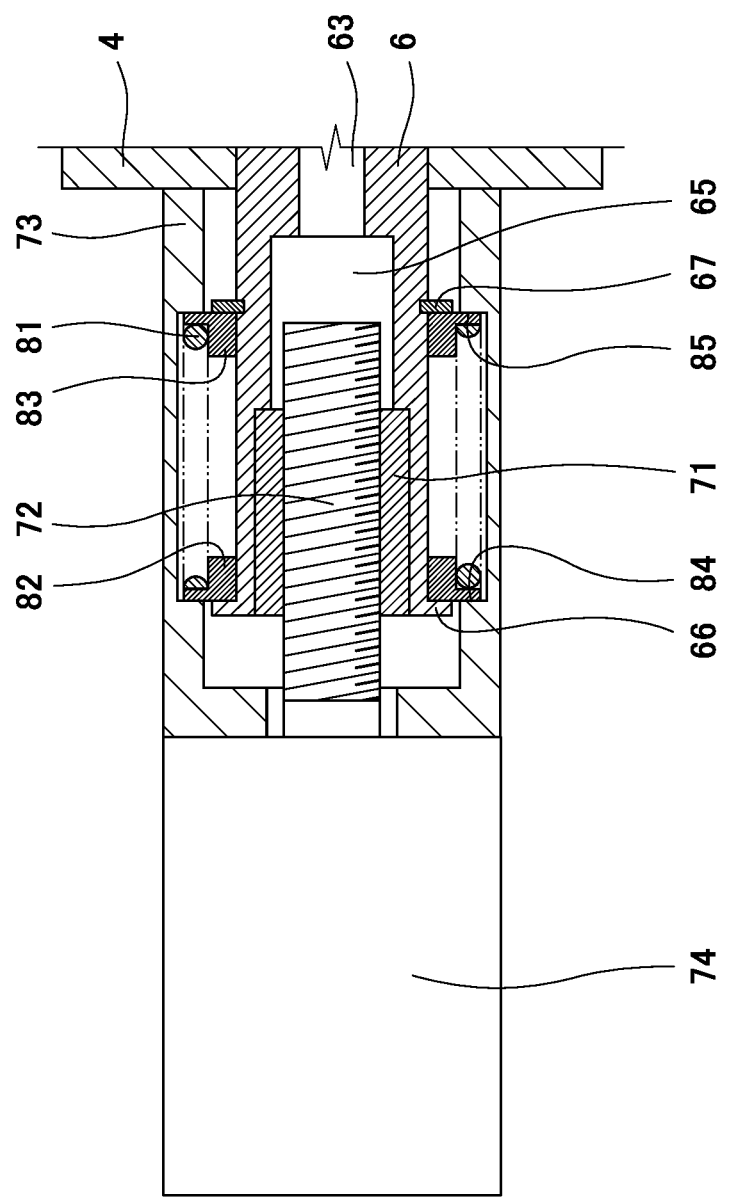
FIG. 3 is an enlarged view of an essential part of FIG. 2.

As shown in FIG. 3, the present embodiment includes a mechanism between the casing 73 and the left side portion of the piston 6. The mechanism serves to keep the spool 3 at the neutral position when the electric motor 74 is not supplied with electric power. The mechanism includes: a coil spring 81, within which the nut 71 is positioned; and a first spring receiver 82 and a second spring receiver 83, which support both ends of the coil spring 81, respectively.

The coil spring 81 applies an urging force to the piston 6 to keep the spool 3 at the neutral position. Each of the first spring receiver 82 and the second spring receiver 83 is ring-shaped and slidably fitted to the left side portion of the piston 6.

The piston 6 includes a flange 66 at its left end. The flange 66 contacts the first spring receiver 82. At a position that is away from the flange 66 toward the right side, a stopper 67, which contacts the second spring receiver 83, is mounted to the piston 6.

On the inner side surface of the tubular casing 73, a first stepped portion 84 is located at a position corresponding to the flange 66, and a second stepped portion 85 is located at a position corresponding to the stopper 67.

With the above-described structure, when the electric motor 74 is not supplied with electric power, the urging force of the coil spring 81 causes the first spring receiver 82 to contact both the flange 66 and the first stepped portion 84, and causes the second spring receiver 83 to contact both the stopper 67 and the second stepped portion 85. Consequently, the spool 3 is kept at the neutral position.

From a state where the spool 3 is at the neutral position, when the piston 6 shifts toward the right side, the first spring receiver 82 is pushed by the flange 66 to become spaced apart from the first stepped portion 84, and also, the stopper 67 becomes spaced apart from the second spring receiver 83. On the other hand, from the state where the spool 3 is at the neutral position, when the piston 6 shifts toward the left side, the flange 66 becomes spaced apart from the first spring receiver 82, and also, the second spring receiver 83 is pushed by the stopper 67 to become spaced apart from the second stepped portion 85.

Next, the second housing 4 and the internal structure thereof are described in more detail with reference to FIG. 2.

The second housing 4 includes an input port 4a and a drain port 4b on its outer surface. The input port 4a is to be connected to a pressure source 11 of a hydraulic fluid (e.g., a hydraulic pump). The drain port 4b is connected to, for example, a tank 12, which stores the hydraulic fluid. For example, in a case where a fluid flowing between the passages 22 to 24 of the first housing 2 is oil, the hydraulic fluid supplied from the pressure source 11 to the input port 4a may be the same oil as the oil flowing between the passages 22 to 24.

The second housing 4 includes a first passage 44, which extends from the input port 4a to the first pressure chamber 42. That is, the first pressure chamber 42 communicates with the input port 4a via the first passage 44.

At the bottom (the right side) of the internal space of the sleeve 5, there is a drain chamber 53, which faces the right end surface of the piston 6. The sleeve 5 includes side holes 54 and 55, which extend radially outward from the drain chamber 53.

The second housing 4 includes an annular groove 46 on the inner peripheral surface of the servo chamber 41. The annular groove 46 is located at a position corresponding to the side holes 54 and 55. The second housing 4 further includes a second passage 47, which extends from the bottom of the annular groove 46 to the drain port 4b.

The piston 6 includes a longitudinal hole 63, which extends along the center line of the piston 6. The longitudinal hole 63 allows the drain chamber 53 and the above-described holding hole 65 to communicate with each other.

The piston 6 further includes, on its outer peripheral surface, a first annular groove 61 and a second annular groove 62. The second annular groove 62 is positioned on the right side relative to the first annular groove 61. Accordingly, there is a land 60 between the first annular groove 61 and the second annular groove 62.

The sleeve 5 includes a first passage 51 and a second passage 52. The first passage 51 allows the first pressure chamber 42 and the first annular groove 61 to communicate with each other. The second passage 52 allows the second pressure chamber 43 to communicate with the first annular groove 61 or the second annular groove 62. The second passage 52 includes, on the inner peripheral surface of the sleeve 5, a first opening 52a for the first annular groove 61 and a second opening 52b for the second annular groove 62.

The distance from the left end of the first opening 52a to the right end of the second opening 52b is set to be equal to the width of the land 60 (i.e., the distance from the first annular groove 61 to the second annular groove 62). The piston 6 further includes side holes 64, which extend from the bottom of the second annular groove 62 to the longitudinal hole 63.

The external diameter of the sleeve 5 is set to be larger than the maximum diameter of the spool 3 in the slide hole 21. Accordingly, a leftward force F1 of the hydraulic fluid in the first pressure chamber 42 is applied to the sleeve 5. In a case where the pressure in the first pressure chamber 42 is P1, the maximum diameter of the spool 3 in the slide hole 21 is Da, and the external diameter of the sleeve 5 is Db, the following equation holds true.

$$F1 = P1 \times \pi \times ((Db/2)^2 - (Da/2)^2)$$

Meanwhile, a rightward force F2 of the hydraulic fluid in the second pressure chamber 43 is also applied to the sleeve 5. In a case where the pressure in the second pressure chamber 43 is P2, the external diameter of the sleeve 5 is Db, and the diameter of the piston 6 is Dc, the following equation holds true.

$$F2 = P1 \times \pi \times ((Db/2)^2 - (Dc/2)^2)$$

In the configuration as described above, the pressure P2 in the second pressure chamber 43 is adjusted such that the leftward force F1 and the rightward force F2, which are applied to the sleeve 5, are balanced (F1=F2). In the balanced state, the sleeve 5 is at such a position that the first opening 52a and the second opening 52b of the second passage 52 are sealed by the land 60 of the piston 6. Therefore, the second pressure chamber 43 is blocked from the input port 4a and the drain port 4b by the piston 6.

From the balanced state, when the piston 6 is shifted by the electric motor 74 toward the right side (in a direction toward the spool 3), the second pressure chamber 43 comes into communication with the input port 4a via the second passage 52, the first annular groove 61, the first passage 51, the first pressure chamber 42, and the first passage 44. Consequently, the pressure in the second pressure chamber 43 increases, and the sleeve 5 also shifts toward the right side. However, when the sleeve 5 shifts toward the right side beyond the position where the balanced state is achieved, the second pressure chamber 43 comes into communication with the drain port 4b via the second passage 52, the second annular groove 62, the side holes 64, the longitudinal hole 63, the drain chamber 53, the side holes 54 and 55, the annular groove 46, and the second passage 47. Consequently, the pressure in the second pressure chamber 43 decreases. Due to this function, the sleeve 5 comes to a stop again at the position where the balanced state is achieved. That is, the sleeve 5 shifts toward the right side in a manner to follow the rightward shifting of the piston 6.

On the other hand, from the balanced state, when the piston 6 is shifted by the electric motor 74 toward the left side (in a direction away from the spool 3), the second pressure chamber 43 comes into communication with the drain port 4b via the second passage 52, the second annular groove 62, the side holes 64, the longitudinal hole 63, the drain chamber 53, the side holes 54 and 55, the annular groove 46, and the second passage 47. Consequently, the pressure in the second pressure chamber 43 decreases, and the sleeve 5 also shifts toward the left side. However, when the sleeve 5 shifts toward the left side beyond the position where the balanced state is achieved, the second pressure chamber 43 comes into communication with the input port 4a via the second passage 52, the first annular groove 61, the first passage 51, the first pressure chamber 42, and the first passage 44. Consequently, the pressure in the second pressure chamber 43 increases. Due to this function, the sleeve 5 comes to a stop again at the position where the balanced state is achieved. That is, the sleeve 5 shifts toward the left side in a manner to follow the leftward shifting of the piston 6.

Meanwhile, in a case where the piston 6 does not shift, the balanced state is maintained. That is, the second pressure chamber 43 is blocked from the input port 4a and the drain port 4b by the piston 6. Therefore, even when the spool 3 receives a force from the fluid flowing between the passages 22 to 24 of the first housing 2, due to the incompressibility of the hydraulic fluid in the second pressure chamber 43, the sleeve 5 does not shift.

As described above, in the present disclosure, since the force that the spool 3 receives from the fluid flowing between the passages 22 to 24 does not affect the electric motor 74, even in a case where the electric motor 74 is a low-power motor, the position of the spool 3 can be controlled precisely.

(Variations)

The present disclosure is not limited to the above-described embodiment. Various modifications can be made without departing from the scope of the present disclosure.

For example, the coil spring 81 for keeping the spool 3 at the neutral position may be eliminated. However, in the case of including the coil spring 81 as in the above-described embodiment, regardless of whether or not the electric motor 74 is being supplied with electric power, the spool 3 can be kept at a constant position even when the force that the spool 3 receives from the fluid flowing between the passages 22 to 24 is great. In addition, in the case of including the coil spring 81, the nut 71 is positioned within the coil spring 81. Therefore, it is not necessary to increase the length of the entire spool valve 1 due to the inclusion of the coil spring 81.

SUMMARY

A spool valve according to the present disclosure includes: a first housing including passages and a slide hole; a spool slidably located in the slide hole; a second housing that forms a servo chamber that is coaxial with the slide hole; a sleeve slidably located in the servo chamber, the sleeve dividing the servo chamber into a first pressure chamber and a second pressure chamber, the first pressure chamber being adjacent to the first housing, the second pressure chamber being away from the first housing, the sleeve being coupled to the spool in the first pressure chamber; a piston slidably fitted in the sleeve and extending from inside the sleeve beyond the second pressure chamber; a nut fixed to the piston; a screw shaft screwed with the nut; and an electric motor that rotates the screw shaft. The second housing includes a drain port and an input port that is to be connected to a pressure source of a hydraulic fluid. The first pressure chamber communicates with the input port. In a balanced state where a force that is applied to the sleeve by the hydraulic fluid in the first pressure chamber, and a force that is applied to the sleeve by the hydraulic fluid in the second pressure chamber, are balanced, the second pressure chamber is blocked from the input port and the drain port by the piston. From the balanced state, when the piston shifts in a direction toward the spool, the second pressure chamber comes into communication with the input port. From the balanced state, when the piston shifts in a direction away from the spool, the second pressure chamber comes into communication with the drain port.

According to the above configuration, from the balanced state, when the piston is shifted by the electric motor in the direction toward the spool, the second pressure chamber comes into communication with the input port. Consequently, the pressure in the second pressure chamber increases, and the sleeve also shifts in the direction toward the spool. However, when the sleeve shifts beyond the position where the balanced state is achieved, the second pressure chamber comes into communication with the drain port, and consequently, the pressure in the second pressure chamber decreases. Due to this function, the sleeve comes to a stop again at the position where the balanced state is achieved. That is, the sleeve shifts in a manner to follow the shifting of the piston. The same applies to a case where, from the balanced state, the piston is shifted by the electric motor in the direction away from the spool.

Meanwhile, in a case where the piston does not shift, the balanced state is maintained. That is, the second pressure chamber is blocked from the input port and the drain port by the piston. Therefore, even when the spool receives a force from the fluid flowing between the passages of the first housing, due to the incompressibility of the hydraulic fluid in the second pressure chamber, the sleeve does not shift.

As described above, in the present disclosure, since the force that the spool receives from the fluid flowing between the passages does not affect the electric motor, even in a case where the electric motor is a low-power motor, the position of the spool can be controlled precisely.

The above spool valve may further include a coil spring within which the nut is positioned, the coil spring applying an urging force to the piston to keep the spool at a neutral position thereof. According to this configuration, regardless of whether or not the electric motor is being supplied with electric power, the spool can be kept at a constant position even when the force that the spool receives from the fluid flowing between the passages is great. In addition, in the configuration including the coil spring, the nut is positioned within the coil spring. Therefore, it is not necessary to increase the length of the entire spool valve due to the inclusion of the coil spring.

REFERENCE SIGNS LIST 1 spool valve
11 pressure source
2 first housing
21 slide hole
22 to 24 passage
3 spool
4 second housing
4a input port
4b drain port
41 servo chamber
42 first pressure chamber
43 second pressure chamber
5 sleeve
6 piston
71 nut
72 screw shaft
74 electric motor
81 coil spring

The invention claimed is:
1. A spool valve comprising:
a first housing including passages and a slide hole;
a spool slidably located in the slide hole;
a second housing that forms a servo chamber that is coaxial with the slide hole;
a sleeve slidably located in the servo chamber, the sleeve dividing the servo chamber into a first pressure chamber and a second pressure chamber, the first pressure chamber being adjacent to the first housing, the second pressure chamber being away from the first housing, the sleeve being coupled to the spool in the first pressure chamber;
a piston slidably fitted in the sleeve and extending from inside the sleeve beyond the second pressure chamber;
a nut fixed to the piston;
a screw shaft screwed with the nut;
an electric motor that rotates the screw shaft; and
a coil spring within which the nut is positioned, the coil spring applying an urging force to the piston to keep the spool at a neutral position thereof, wherein
the second housing includes a drain port and an input port that is to be connected to a pressure source of a hydraulic fluid,
the first pressure chamber communicates with the input port,
in a balanced state where a force that is applied to the sleeve by the hydraulic fluid in the first pressure chamber, and a force that is applied to the sleeve by the hydraulic fluid in the second pressure chamber, are balanced, the second pressure chamber is blocked from the input port and the drain port by the piston,
from the balanced state, when the piston shifts in a direction toward the spool, the second pressure chamber comes into communication with the input port, and
from the balanced state, when the piston shifts in a direction away from the spool, the second pressure chamber comes into communication with the drain port.

* * * * *